US006731039B2

(12) United States Patent
Lohr et al.

(10) Patent No.: US 6,731,039 B2
(45) Date of Patent: May 4, 2004

(54) HOLDING AND CONTACTING DEVICE FOR SLIDING CONTACTS; PRINTED CIRCUIT BOARD BRUSH BLOCK

(75) Inventors: Georg Lohr, Eichenau (DE); Herbert Staffler, Fürstenfeldbruck (DE)

(73) Assignee: Schleifring und Apparatebau GmbH (DE)

( * ) Notice: Subject to any disclaimer, the term of this patent is extended or adjusted under 35 U.S.C. 154(b) by 0 days.

(21) Appl. No.: 10/058,889

(22) Filed: Jan. 28, 2002

(65) Prior Publication Data

US 2002/0121832 A1 Sep. 5, 2002

Related U.S. Application Data

(63) Continuation of application No. PCT/DE01/01966, filed on May 23, 2001.

(30) Foreign Application Priority Data

May 26, 2000 (DE) ........................................ 100 26 176

(51) Int. Cl.[7] ................................................ H02K 13/00
(52) U.S. Cl. ........................................................ 310/148
(58) Field of Search ................................ 310/148, 136, 310/135

(56) References Cited

U.S. PATENT DOCUMENTS

| | | | | |
|---|---|---|---|---|
| 4,580,333 A | * | 4/1986 | Griffis | 29/597 |
| 4,583,797 A | | 4/1986 | Engelmore et al. | 339/6 R |
| 5,139,281 A | | 8/1992 | Dzioba | 280/775 |
| 5,509,625 A | * | 4/1996 | Oullette | 244/134 |
| 5,668,424 A | * | 9/1997 | Lamb | 310/648 |
| 5,746,606 A | | 5/1998 | Sobhani | 439/21 |
| 5,808,393 A | | 9/1998 | Penfold et al. | 310/242 |
| 5,870,026 A | * | 2/1999 | Challenger | 310/103 |
| 6,359,363 B1 | * | 3/2002 | Foerstera | 310/239 |

FOREIGN PATENT DOCUMENTS

| | | |
|---|---|---|
| DE | 195 23 899 A1 | 2/1997 |
| DE | 197 43 080 A1 | 8/1999 |

* cited by examiner

*Primary Examiner*—Nicholas Ponomarenko
*Assistant Examiner*—Iraj A. Mohandesi
(74) *Attorney, Agent, or Firm*—St. Onge Steward Johnston & Reens LLC

(57) ABSTRACT

The invention relates to a sliding contact device for transmitting electrical signals or power between at least two units located opposite one another, whereby at least one unit comprises sideways, which are arranged along the trajectory of motion and which are made of electrically conductive material, and a second unit comprises sliding contacts that are in electrical contact with said sideways of the first unit. The invention is characterized in that, in the second unit, several carbon holders are arranged on a supporting plate with conductor tracks for contacting the carbon.

17 Claims, 2 Drawing Sheets

HOLDING AND CONTACTING DEVICE FOR SLIDING CONTACTS; PRINTED CIRCUIT BOARD BRUSH BLOCK

This application is a continuation of pending International Application PCT/DE01/01966 filed on May 23, 2001 and claims priority from German Application 100 26 176.0 filed on May 26, 2000.

FIELD OF THE INVENTION

The invention relates to a device for galvanically coupled transmission of electrical signals. Devices of this kind are known as sideways or, in the case of twisting motion, as slide rings. The contact system consists primarily of metallic sideways, which are in galvanic contact with so-called brushes. Said brushes can be simple metal wires, woven metal, or sintered materials which as a rule contain electrical conducting and lubricated components. The brush type in each case is selected in accordance with the aim of the invention. Metal wire brushes, for instance, are generally very suitable for slow start-up speeds at low voltage levels. At higher voltage strength or at higher speeds, so-called carbons are generally used. Carbons as a rule consist of a sintering material containing graphite and conductive materials such as copper or silver. Other combinations, which are also common, contain Teflon as a sliding material.

In the following description, no distinction is made between contact carbons and brushes on the one hand, and carbon brushes on the other, since, in most technical jargon usage, these terms are interchangeable. In addition, the term "electrode bag" stands for a brush holder, which generally takes the form of a tube with a rectangular or square cross-section, and serves to conduct the carbon so that it can move along only one axis.

Metal wire brushes are particularly simple to secure in place, because at the current state of technology they can be soldered or pressed in without any problems into conductor plates. The holders for carbon brushes are as a rule basically more expensive, first, because they must be issued for higher voltage strengths and, second, because they are intended to allow a multi-axis stable conducting of the brush. One device, in which the carbon is secured in a mounting constructed on a plate, is described in European Patent Application EP 0928051 A2. Devices of this type are primarily designed for use in electrical engines. In this application, a relatively low number of carbons run on a commutator. If the carbons are worn out, it is a simple matter to exchange a few carbons individually. With top-of-the-line sliding contact devices, in which signals must be transmitted with high quality and where low contact noise is essential, a great many carbons are used in most cases. Thus a slide ring system may contain well in excess of 100 carbons. If such a high number of carbons must be individually exchanged and even contacted again, this would take considerable time.

It is therefore the task of the invention to present a device which, even with high numbers of carbons, allows for simple maintenance or a simple replacement of carbons.

The solution of this task is indicated in claim 1. Advantageous applications are indicated in the additional claims.

In accordance with the invention, several carbon holders are arranged on a common supporting plate. The supporting plate itself can be a mechanical stable plate of electrically conducting material, or else can consist of an insulating material with a device for electrical contact. The conductor plate along with the carbon holders affixed to it is arranged in such a way that it can be exchanged as a single complex. This reduces the cost of maintenance for devices with high carbon content.

In a particularly advantageous realization of the invention, the supporting plate takes the form of a conductor plate.

In an additional advantageous realization of the invention, at least one connection element that is electrically connected with the carbons or carbon holders is provided for contacting the single complex. This can take the form, for instance, of a plug contact or a screw clamp.

In a particularly advantageous realization of the invention, the carbon holders, which are assigned to the carbons for individual sideways or groups of sideways, are arranged collectively on individual conductor plates. In sliding contact arrangements, in which for example power or signals of small capacity are transmitted, the lifetimes of the carbons vary. In most cases the contact carbons used for power transmission have a substantially shorter lifetime and must therefore be replaced frequently. It is useful therefore to bring together the carbon holders of the carbons of individual sideways or individual groups of sideways on individual conductor plates.

In an additional advantageous realization of the invention, the conductor plate is arranged in such a way that it assumes the function of the mechanical guidance or of the electrical contacting of the carbons. As tests have shown, with silver graphite carbons with connection cords, which are inserted in an electrically conductive electrode bag, about one-third of the current flows through the connection cord, while the major portion of the current runs over the electrode bag. But if the conductor plate is set up so that it can come into mechanical or electrical contact with the carbon, then in this manner a considerable portion of the current can be transmitted.

In an additional advantageous realization of the invention, the conductor plate is so designed that, in the case of a carbon with connection cord, the conduction cord can be directly contacted with the conductor plate. Such an arrangement is particularly appropriate if no electrical contact can be produced between the carbon holder inner lining and the carbon.

In an additional advantageous realization of the invention, additional guide units of the sliding contacts are affixed on the conductor plate, which guide units for instance are designed as U-shaped so that they present a mechanical guidance of the slide carbons with the conductor plate.

In an additional advantageous realization of the invention, in the case of carbons with at least one lateral guide surface, they are arranged so that this guide surface stands in contact with an electrical conductive surface of the conductor plate. With square-shaped carbons this means that, for instance, a lateral surface is arranged parallel to the conductor plate on a conducting track, which serves the electrical contact.

In an additional advantageous realization of the invention, individual conductor plates are secured in their position through mechanical guide elements. Particularly suitable for this are guide tracks and/or alignment pins which make possible a mounting without additional adjustment efforts.

In an additional advantageous realization of the invention, individual conductor plates are secured in their position by means of a notching device or other mechanical locking system. Particularly advantageous here are notching devices that can be released only by means of a tool, such as for instance a screwdriver. For an additional security element, a securing screw can be provided to prevent any accidental release of the conductor plate from its holder.

In an additional advantageous realization of the invention, the conductor plates are arranged so that individual conductor plates or groups of conductor plates can be exchanged to replace worn-out contacts.

In an additional advantageous realization of the invention, at least one sliding contact has a marker to provide a measurement of abrasion. As a result, the wearing out of the sliding contact can be indicated. In one group of parallel connected sliding contacts, they generally show a similar rate of wear. It is sufficient, therefore, to monitor the wearing of just one sliding contact.

In another realization, at least one sliding contact is connected with a mechanical wear indicator. Such a wear indicator can be a simple pin, which indicates the remaining level of the sliding contacts, or else a complex mechanical structure with tracer levers or the like.

In an additional advantageous realization of the invention, electronic components are integrated on the conductor plate to diagnose or signal the condition of the sliding contact arrangement. These electronic components can communicate the condition of the sliding contact device by means of numerous measurements, such as of the carbon route, of the wear, or of the electrical transmission resistance, and relay this condition to a central monitoring unit. This unit is then in a position to give a signal in a timely manner for the replacement of the contact carbons or of individual conductor plates.

The invention is described below without limitation of the general inventive concept on the basis of realizations as per illustrations, to which explicit reference is made to communicate all details of the invention that are not further elaborated in the text. The illustrations are as follows.

DETAILED DESCRIPTION OF DRAWINGS

Figure 1:
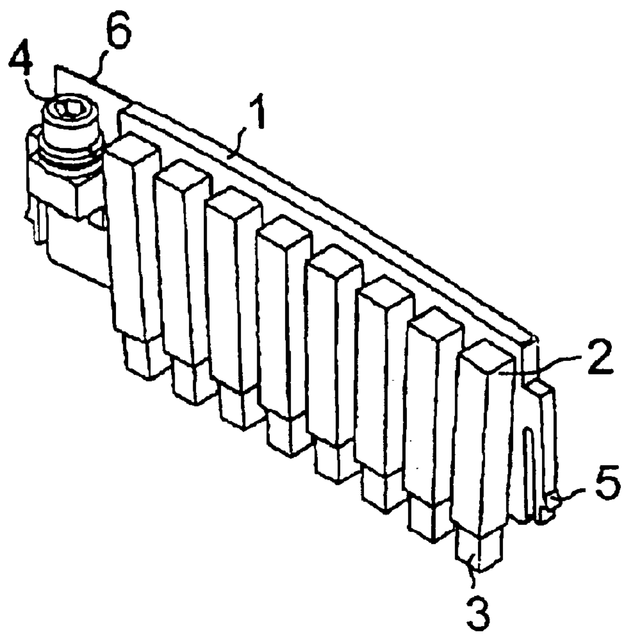
FIG. 1. One example of a demonstration of the device according to this invention.

FIG. 1 for instance portrays a device in accordance with the invention. As examples, eight carbon holders (2) are mounted on a conductor plate (1) to receive the contact carbons (3). Through the copper lamination of the surface of the conductor plate, these carbon holders are all connected to one another as well as with the connection element (4). An additional plate (6) of insulation material provides a sufficient tension security for the adjacent complex. The securing of the complex in a corresponding support is provided by means of the notching hook (5).

Figure 2:
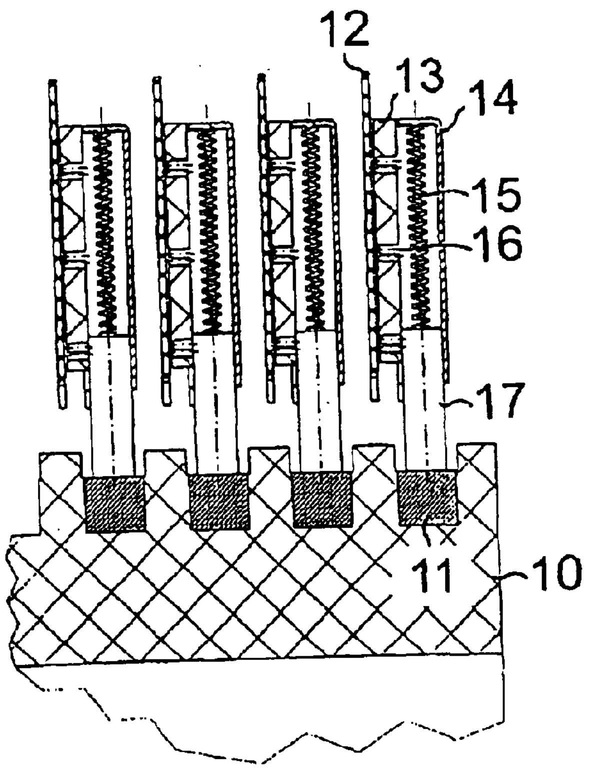
FIG. 2. One example of a device with several sections or complexes.
Figure 3:
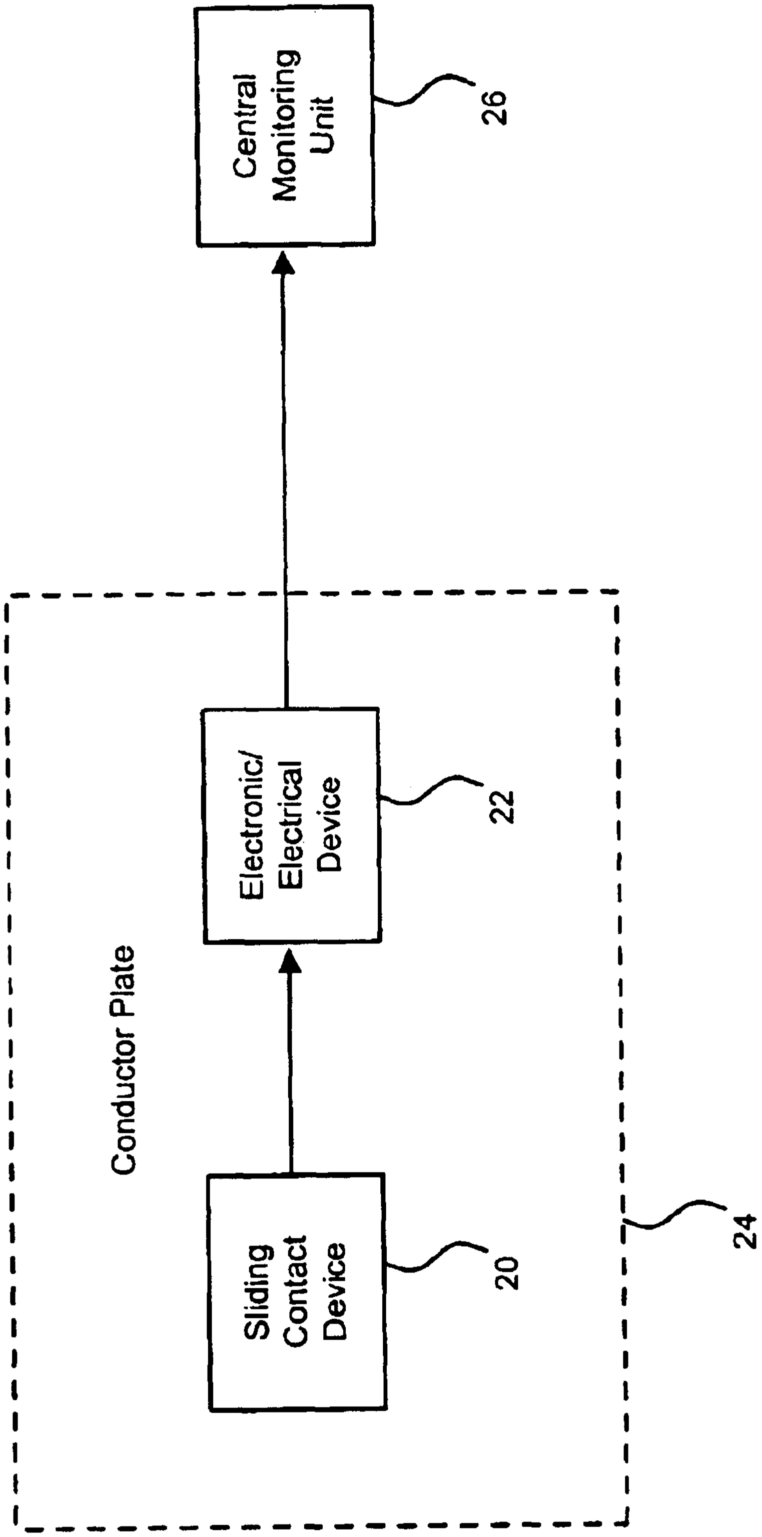
FIG. 3 discloses the sliding contact device 20 which includes a brush holder and brush assembly, and electronic and/or electrical device 22. Both sliding contact device 20 and electronic and/or electrical device 22 are integrated on the conductor plate 24. Sliding contact device 20 is monitored by electronic and/or electrical device 22, which in turn will generate a diagnostic or a signal relating to the condition of the sliding contact device 20 to be sent to a central monitoring unit 26. The electronic and/or electrical device 22 can communicate the condition of the sliding contact device 20 by means of numerous measurements, such as of the carbon route, of the wear, or of the electrical transmission resistance.

FIG. 2 presents a complete mounting unit, consisting of several complexes. In the sectional illustration, the interior structure of the carbon holder is made particularly clear, along with its connection to the supporting plate. Here one sliding ring module carries, for instance, several sideways (11). These sideways are contacted by carbons (17), which are conducted into the corresponding carbon holders (14). The contact of the carbon itself takes place by way of an electrically conducting surface of the supporting plate (13) in which the carbon mounting (14) is injected by means of the contact pins. The electrical insulation for the neighboring complex takes place by way of a plate of insulation material (12). The pressure spring (15) presses the carbons (17) with a pre-set pressure against the slideway (11).

What is claimed is:

1. A sliding contact device for transmitting electrical signals or power between at least two units located opposite one another, whereby at least one unit comprises sideways, which are arranged along the trajectory of motion and which are made of electrically conductive material, and a second unit comprises sliding contacts that are in electrical contact with said sideways of the first unit, characterized in that in the second unit, several carbon holders are arranged on a supporting plate such that the carbon holders electrically connect the sliding contacts with the supporting plate.

2. Device in accordance with claim 1 characterized in that the supporting plate is produced as a copper-laminated conductor plate with sideways.

3. Device in accordance with claim 1 characterized in that at least one connection element is present, which is electrically connected with the carbon holders or carbons by means of the sideways.

4. Device in accordance with claim 1 characterized in that in the event of a multi-channel device for simultaneous transmission of several signals, the slide contacts for individual signals or groups of signals are arranged on individual conductor plates.

5. Device in accordance with claim 1 characterized in that the holder plates are formed in such a way that they simultaneously perform the function of mechanical conducting or of electrical contacting of the sliding contacts.

6. Device in accordance with claim 1 characterized in that in the event of the use of carbons with contact cords in the carrier plate, a connection facility for the contact cord is provided.

7. Device in accordance with claim 1 characterized in that, perpendicular to the slideways, there are carrier plates on which the guide unit of the sliding contacts are arranged, applied parallel to the conducting surface, so that these sliding contacts, together with the carrier plate, form a carbon holder.

8. Device in accordance with claim 1 characterized in that in case of sliding contacts with at least one lateral guide surface, this surface is arranged so that it is contacted by an electrically conducting surface of the carrier plate.

9. Device in accordance with claim 1 characterized in that individual carrier plates are secured in their position by means of mechanical guide elements, preferably by means of guide rails and/or alignment pins.

10. Device in accordance with claim 1 characterized in that individual carrier plates are secured in their position through a notching device or through another mechanical locking system.

11. Device in accordance with claim 1 characterized in that individual carrier plates or groups of carrier plates are arranged in such a way that they can be exchanged to replace worn-out sliding contacts.

12. Device in accordance with claim 1 characterized in that at least one sliding contact possesses a marking to indicate wearing.

13. Device in accordance with claim 1 characterized in that at least one sliding contact is connected with a mechanical wear indicator.

14. Device in accordance with claim 1 characterized in that, electronic components, utilized for diagnosing or signaling the condition of the sliding contact device, are integrated on the conductor plate.

15. Device in accordance with claim 1 characterized in that the holder plates are formed in such a way that they simultaneously perform the function of mechanical conducting and electrical contacting of the sliding contacts.

16. Device in accordance with claim 1 characterized in that electronic or electrical components for diagnosing and signaling the condition of the sliding contact device are integrated on the conductor plate.

17. A sliding contact device for transmitting electrical signals or power between at least two units located opposite one another, comprising:

a slideway, arranged along the trajectory of motion and which is made of electrically conductive material, a supporting plate;

a sliding contact, arranged to be in electrical contact with the slideway and being mounted to the supporting plate, the sliding contact having:

a brush holder, electrically contacting the supporting plate; and a brush, electrically contacting the brush holder such that the brush holder electrically connects the brush with the supporting plate.

* * * * *